(12) United States Patent
Salter et al.

(10) Patent No.: US 10,150,396 B2
(45) Date of Patent: Dec. 11, 2018

(54) VEHICLE CUP HOLDER ASSEMBLY WITH PHOTOLUMINESCENT ACCESSORY FOR INCREASING THE NUMBER OF AVAILABLE CUP HOLDERS

(71) Applicant: Ford Global Technologies, LLC, Dearborn, MI (US)

(72) Inventors: Stuart C. Salter, White Lake, MI (US); Annette Lynn Huebner, White Lake, MI (US); Josh Greiner, Detroit, MI (US); Kristin Ann Hellman, Walled Lake, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 0 days.

(21) Appl. No.: 15/453,397

(22) Filed: Mar. 8, 2017

(65) Prior Publication Data
US 2018/0257535 A1    Sep. 13, 2018

(51) Int. Cl.
*B60N 3/10*   (2006.01)
*B60Q 3/225*  (2017.01)
*B60Q 3/60*   (2017.01)

(52) U.S. Cl.
CPC ............ *B60N 3/102* (2013.01); *B60Q 3/225* (2017.02); *B60Q 3/60* (2017.02)

(58) Field of Classification Search
CPC ......... B60N 3/10; B60N 3/102; B60N 3/103; B60N 3/105; B60N 3/107; A47G 23/02; A47G 23/0266
USPC .............................. 296/24.34, 1.07; 224/926
See application file for complete search history.

(56) References Cited

U.S. PATENT DOCUMENTS

| | | | |
|---|---|---|---|
| 2,486,859 A | 11/1949 | Meijer et al. | |
| 4,927,108 A * | 5/1990 | Blazic | A47K 1/08 224/281 |
| 5,053,930 A | 10/1991 | Benavides | |
| 5,060,899 A * | 10/1991 | Lorence | B60N 3/102 224/401 |
| 5,195,711 A * | 3/1993 | Miller | A47C 7/70 224/275 |
| 5,248,183 A * | 9/1993 | Gignac | B60N 2/793 297/188.16 |
| 5,330,146 A * | 7/1994 | Spykerman | B60N 3/102 224/281 |
| 5,434,013 A | 7/1995 | Fernandez | |
| 5,709,453 A | 1/1998 | Krent et al. | |
| 5,839,718 A | 11/1998 | Hase et al. | |
| 5,873,486 A | 2/1999 | Morgan | |
| 6,031,511 A | 2/2000 | DeLuca et al. | |

(Continued)

FOREIGN PATENT DOCUMENTS

| CN | 101337492 A | 1/2009 |
|---|---|---|
| CN | 201169230 Y | 2/2009 |

(Continued)

*Primary Examiner* — Gregory A Blankenship
(74) *Attorney, Agent, or Firm* — Vichit Chea; Price Heneveld LLP (57) ABSTRACT

A vehicle cup holder assembly is provided herein. A receptacle is assembled to a vehicle console and a light source is coupled to the receptacle. An accessory is coupled to the receptacle and is deployable therefrom to increase the number of available cup holders in which to receive a beverage container. The accessory is configured to luminesce in response to light excitation by the light source.

18 Claims, 4 Drawing Sheets

(56) References Cited

U.S. PATENT DOCUMENTS

| | | | |
|---|---|---|---|
| 6,117,362 A | 9/2000 | Yen et al. | |
| 6,294,990 B1 | 9/2001 | Knoll et al. | |
| 6,419,854 B1 | 7/2002 | Yocom et al. | |
| 6,494,490 B1 | 12/2002 | Trantoul | |
| 6,577,073 B2 | 6/2003 | Shimizu et al. | |
| 6,729,738 B2 | 5/2004 | Fuwausa et al. | |
| 6,737,964 B2 | 5/2004 | Samman et al. | |
| 6,773,129 B2 | 8/2004 | Anderson, Jr. et al. | |
| 6,820,888 B1 | 11/2004 | Griffin | |
| 6,851,840 B2 | 2/2005 | Ramamurthy et al. | |
| 6,859,148 B2 | 2/2005 | Miller | |
| 6,871,986 B2 | 3/2005 | Yamanaka et al. | |
| 6,953,536 B2 | 10/2005 | Yen et al. | |
| 6,990,922 B2 | 1/2006 | Ichikawa et al. | |
| 7,015,893 B2 | 3/2006 | Li et al. | |
| 7,161,472 B2 | 1/2007 | Strumolo et al. | |
| 7,210,829 B2 | 5/2007 | Okazaki et al. | |
| 7,213,923 B2 | 5/2007 | Liu et al. | |
| 7,216,997 B2 | 5/2007 | Anderson, Jr. | |
| 7,249,869 B2 | 7/2007 | Takahashi et al. | |
| 7,264,366 B2 | 9/2007 | Hulse | |
| 7,264,367 B2 | 9/2007 | Hulse | |
| 7,347,576 B2 | 3/2008 | Wang et al. | |
| 7,441,914 B2 | 10/2008 | Palmer et al. | |
| 7,501,749 B2 | 3/2009 | Takeda et al. | |
| 7,575,349 B2 | 8/2009 | Bucher et al. | |
| 7,635,212 B2 | 12/2009 | Seidler | |
| 7,726,856 B2 | 6/2010 | Tsutsumi | |
| 7,745,818 B2 | 6/2010 | Sofue et al. | |
| 7,753,541 B2 | 7/2010 | Chen et al. | |
| 7,834,548 B2 | 11/2010 | Jousse et al. | |
| 7,862,220 B2 | 1/2011 | Cannon et al. | |
| 7,987,030 B2 | 7/2011 | Flores et al. | |
| 8,016,465 B2 | 9/2011 | Egerer et al. | |
| 8,022,818 B2 | 9/2011 | la Tendresse et al. | |
| 8,044,415 B2 | 10/2011 | Messere et al. | |
| 8,066,416 B2 | 11/2011 | Bucher | |
| 8,071,988 B2 | 12/2011 | Lee et al. | |
| 8,097,843 B2 | 1/2012 | Agrawal et al. | |
| 8,118,441 B2 | 2/2012 | Hessling | |
| 8,120,236 B2 | 2/2012 | Auday et al. | |
| 8,136,425 B2 | 3/2012 | Bostick | |
| 8,163,201 B2 | 4/2012 | Agrawal et al. | |
| 8,169,131 B2 | 5/2012 | Murazaki et al. | |
| 8,178,852 B2 | 5/2012 | Kingsley et al. | |
| 8,197,105 B2 | 6/2012 | Yang | |
| 8,203,260 B2 | 6/2012 | Li et al. | |
| 8,207,511 B2 | 6/2012 | Bortz et al. | |
| 8,232,533 B2 | 7/2012 | Kingsley et al. | |
| 8,247,761 B1 | 8/2012 | Agrawal et al. | |
| 8,261,686 B2 | 9/2012 | Birman et al. | |
| 8,286,378 B2 | 10/2012 | Martin et al. | |
| 8,317,329 B2 | 11/2012 | Seder et al. | |
| 8,317,359 B2 | 11/2012 | Harbers et al. | |
| 8,408,766 B2 | 4/2013 | Wilson et al. | |
| 8,415,642 B2 | 4/2013 | Kingsley et al. | |
| 8,421,811 B2 | 4/2013 | Odland et al. | |
| 8,459,832 B2 | 6/2013 | Kim | |
| 8,466,438 B2 | 6/2013 | Lambert et al. | |
| 8,474,897 B1 * | 7/2013 | Jackson | B60R 7/04 296/24.34 |
| 8,485,680 B2 * | 7/2013 | Anderson | B60N 3/108 224/926 |
| 8,519,359 B2 | 8/2013 | Kingsley et al. | |
| 8,519,362 B2 | 8/2013 | Labrot et al. | |
| 8,539,702 B2 | 9/2013 | Li et al. | |
| 8,552,848 B2 | 10/2013 | Rao et al. | |
| 8,606,430 B2 | 12/2013 | Seder et al. | |
| 8,624,716 B2 | 1/2014 | Englander | |
| 8,631,598 B2 | 1/2014 | Li et al. | |
| 8,653,553 B2 | 2/2014 | Yamazaki et al. | |
| 8,662,580 B2 * | 3/2014 | Henke | B60N 3/101 297/188.14 |
| 8,664,624 B2 | 3/2014 | Kingsley et al. | |
| 8,683,722 B1 | 4/2014 | Cowan | |
| 8,724,054 B2 | 5/2014 | Jones | |
| 8,754,426 B2 * | 6/2014 | Marx | F21K 9/00 257/88 |
| 8,770,775 B2 * | 7/2014 | Abro | B60N 3/101 224/926 |
| 8,773,012 B2 | 7/2014 | Ryu et al. | |
| 8,846,184 B2 | 9/2014 | Agrawal et al. | |
| 8,851,694 B2 | 10/2014 | Harada | |
| 8,876,352 B2 | 11/2014 | Robbins et al. | |
| 8,905,610 B2 | 12/2014 | Coleman et al. | |
| 8,952,341 B2 | 2/2015 | Kingsley et al. | |
| 8,994,495 B2 | 3/2015 | Dassanayake et al. | |
| 9,006,751 B2 | 4/2015 | Kleo et al. | |
| 9,018,833 B2 | 4/2015 | Lowenthan et al. | |
| 9,057,021 B2 | 6/2015 | Kingsley et al. | |
| 9,059,378 B2 | 6/2015 | Verger et al. | |
| 9,065,447 B2 | 6/2015 | Buttolo et al. | |
| 9,067,530 B2 | 6/2015 | Bayersdorfer et al. | |
| 9,187,034 B2 | 11/2015 | Tarahomi et al. | |
| 9,299,887 B2 | 3/2016 | Lowenthal et al. | |
| 9,315,148 B2 | 4/2016 | Schwenke et al. | |
| 9,452,709 B2 | 9/2016 | Aburto Crespo | |
| 9,568,659 B2 | 2/2017 | Verger et al. | |
| 9,616,812 B2 | 4/2017 | Sawayanagi | |
| 2002/0043603 A1 * | 4/2002 | Thomas | B60N 3/103 248/311.2 |
| 2002/0159741 A1 | 10/2002 | Graves et al. | |
| 2002/0163792 A1 | 11/2002 | Formoso | |
| 2003/0167668 A1 | 9/2003 | Kuks et al. | |
| 2003/0179548 A1 | 9/2003 | Becker et al. | |
| 2004/0213088 A1 | 10/2004 | Fuwausa | |
| 2005/0084229 A1 | 4/2005 | Babbitt et al. | |
| 2005/0189776 A1 * | 9/2005 | Sturt | B60N 3/102 296/24.34 |
| 2005/0189795 A1 | 9/2005 | Roessler | |
| 2006/0071497 A1 * | 4/2006 | Radu | B60N 3/102 296/24.34 |
| 2006/0087826 A1 | 4/2006 | Anderson, Jr. | |
| 2006/0097121 A1 | 5/2006 | Fugate | |
| 2007/0032319 A1 | 2/2007 | Tufte | |
| 2007/0182183 A1 * | 8/2007 | Lota | B60R 7/04 296/24.34 |
| 2007/0200041 A1 * | 8/2007 | Kukucka | B60N 3/101 248/311.2 |
| 2007/0285938 A1 | 12/2007 | Palmer et al. | |
| 2007/0297045 A1 | 12/2007 | Sakai et al. | |
| 2008/0164168 A1 * | 7/2008 | Gramoy | B60N 3/10 206/316.1 |
| 2008/0205075 A1 | 8/2008 | Hikmet et al. | |
| 2009/0217970 A1 | 9/2009 | Zimmerman et al. | |
| 2009/0219730 A1 | 9/2009 | Syfert et al. | |
| 2009/0251920 A1 | 10/2009 | Kino et al. | |
| 2009/0260562 A1 | 10/2009 | Folstad et al. | |
| 2009/0262515 A1 | 10/2009 | Lee et al. | |
| 2010/0102736 A1 | 4/2010 | Hessling | |
| 2011/0012062 A1 | 1/2011 | Agrawal et al. | |
| 2011/0265360 A1 | 11/2011 | Podd et al. | |
| 2012/0001406 A1 | 1/2012 | Paxton et al. | |
| 2012/0104954 A1 | 5/2012 | Huang | |
| 2012/0183677 A1 | 7/2012 | Agrawal et al. | |
| 2012/0280528 A1 | 11/2012 | Dellock et al. | |
| 2013/0050979 A1 | 2/2013 | Van De Ven et al. | |
| 2013/0092965 A1 | 4/2013 | Kijima et al. | |
| 2013/0335994 A1 | 12/2013 | Mulder et al. | |
| 2014/0003044 A1 | 1/2014 | Harbers et al. | |
| 2014/0029281 A1 | 1/2014 | Suckling et al. | |
| 2014/0065442 A1 | 3/2014 | Kingsley et al. | |
| 2014/0103258 A1 | 4/2014 | Agrawal et al. | |
| 2014/0211498 A1 | 7/2014 | Cannon et al. | |
| 2014/0264396 A1 | 9/2014 | Lowenthal et al. | |
| 2014/0266666 A1 | 9/2014 | Habibi | |
| 2014/0355252 A1 * | 12/2014 | Antilla | B60N 3/101 362/101 |
| 2014/0373898 A1 | 12/2014 | Rogers et al. | |
| 2015/0046027 A1 | 2/2015 | Sura et al. | |
| 2015/0085488 A1 | 3/2015 | Grote, III et al. | |
| 2015/0109602 A1 | 4/2015 | Martin et al. | |
| 2015/0138789 A1 | 5/2015 | Singer et al. | |

(56) References Cited

U.S. PATENT DOCUMENTS

| | | |
|---|---|---|
| 2015/0267881 A1 | 9/2015 | Salter et al. |
| 2015/0307033 A1 | 10/2015 | Preisler et al. |
| 2016/0016506 A1 | 1/2016 | Collins et al. |
| 2016/0102819 A1 | 4/2016 | Misawa et al. |
| 2016/0131327 A1 | 5/2016 | Moon et al. |
| 2016/0236613 A1 | 8/2016 | Trier |
| 2016/0240794 A1 | 8/2016 | Yamada et al. |
| 2016/0243969 A1* | 8/2016 | Dunham ................ B60N 3/102 |
| 2017/0158125 A1 | 6/2017 | Schuett et al. |
| 2017/0253179 A1 | 9/2017 | Kumada |
| 2018/0079357 A1* | 3/2018 | Kikuchi .................. B60Q 3/64 |
| 2018/0215320 A1* | 8/2018 | Mendoza Vera ......... B60N 3/10 |
| 2018/0257535 A1* | 9/2018 | Salter .................... B60N 3/102 |

FOREIGN PATENT DOCUMENTS

| | | |
|---|---|---|
| CN | 201193011 Y | 2/2009 |
| CN | 204127823 U | 1/2015 |
| DE | 4120677 A1 | 1/1992 |
| DE | 29708699 U1 | 7/1997 |
| DE | 10319396 A1 | 11/2004 |
| EP | 1793261 A1 | 6/2007 |
| EP | 2778209 A1 | 9/2014 |
| JP | 2000159011 A | 6/2000 |
| JP | 2007238063 A | 9/2007 |
| KR | 20060026531 A | 3/2006 |
| KR | 20120040580 A | 4/2012 |
| WO | 2006047306 A1 | 5/2006 |
| WO | 2014068440 A1 | 5/2014 |
| WO | 2014161927 A1 | 10/2014 |

\* cited by examiner

VEHICLE CUP HOLDER ASSEMBLY WITH PHOTOLUMINESCENT ACCESSORY FOR INCREASING THE NUMBER OF AVAILABLE CUP HOLDERS

FIELD OF THE INVENTION

The present invention generally relates to vehicle cup holder assemblies, and more particularly, to vehicle cup holder assemblies assembled to a vehicle console.

BACKGROUND OF THE INVENTION

Vehicles have limited storage options for beverage containers due to space concerns. Accordingly, there is a need for a vehicle cup holder assembly that is capable of increasing the number of available cup holders without taking up too much space.

SUMMARY OF THE INVENTION

According to one aspect of the present invention, a vehicle cup holder assembly is provided. A receptacle is assembled to a vehicle console and a light source is coupled to the receptacle. An accessory is coupled to the receptacle and is deployable therefrom to increase the number of available cup holders in which to receive a beverage container. The accessory is configured to luminesce in response to light excitation by the light source.

According to another aspect of the present invention, a vehicle cup holder assembly is provided. A receptacle is assembled to a vehicle console and a light source is coupled to the receptacle. An accessory is stowable in the receptacle and is configured to luminesce in response to light excitation by the light source. The accessory is deployable from the receptacle to enable receipt of a beverage container in either the receptacle or the accessory.

According to yet another aspect of the present invention, a vehicle cup holder assembly is provided. A receptacle is assembled to a vehicle console and a light source is coupled to the receptacle. An accessory covers the receptacle and includes a cutout interfacing with the receptacle. The accessory is configured to luminesce in response to light excitation by the light source and is deployable to enable receipt of a beverage container in either the receptacle or the cutout.

These and other aspects, objects, and features of the present invention will be understood and appreciated by those skilled in the art upon studying the following specification, claims, and appended drawings.

DETAILED DESCRIPTION OF THE PREFERRED EMBODIMENTS

As required, detailed embodiments of the present invention are disclosed herein.

However, it is to be understood that the disclosed embodiments are merely exemplary of the invention that may be embodied in various and alternative forms. The figures are not necessarily to a detailed design and some schematics may be exaggerated or minimized to show function overview. Therefore, specific structural and functional details disclosed herein are not to be interpreted as limiting, but merely as a representative basis for teaching one skilled in the art to variously employ the present invention.

As used herein, the term "and/or," when used in a list of two or more items, means that any one of the listed items can be employed by itself, or any combination of two or more of the listed items can be employed. For example, if a composition is described as containing components A, B, and/or C, the composition can contain A alone; B alone; C alone; A and B in combination; A and C in combination; B and C in combination; or A, B, and C in combination.

Referring to FIGS. 1-8, a vehicle cup holder assembly is generally designated by reference numeral 10. The vehicle cup holder assembly 10 includes a receptacle 12 assembled to a vehicle console 18 such as a center console. A light source 20 exemplarily configured as an LED light ring is coupled to the receptacle 12. An accessory 22 is coupled to the receptacle 12 and is deployable therefrom to increase the number of available cup holders in which to receive a beverage container. The accessory 22 is configured to luminesce in response to light excitation 24 by the light source 20. With respect to the embodiments described herein, luminescent light is exemplarily represented by dashed arrows.

Figure 1:
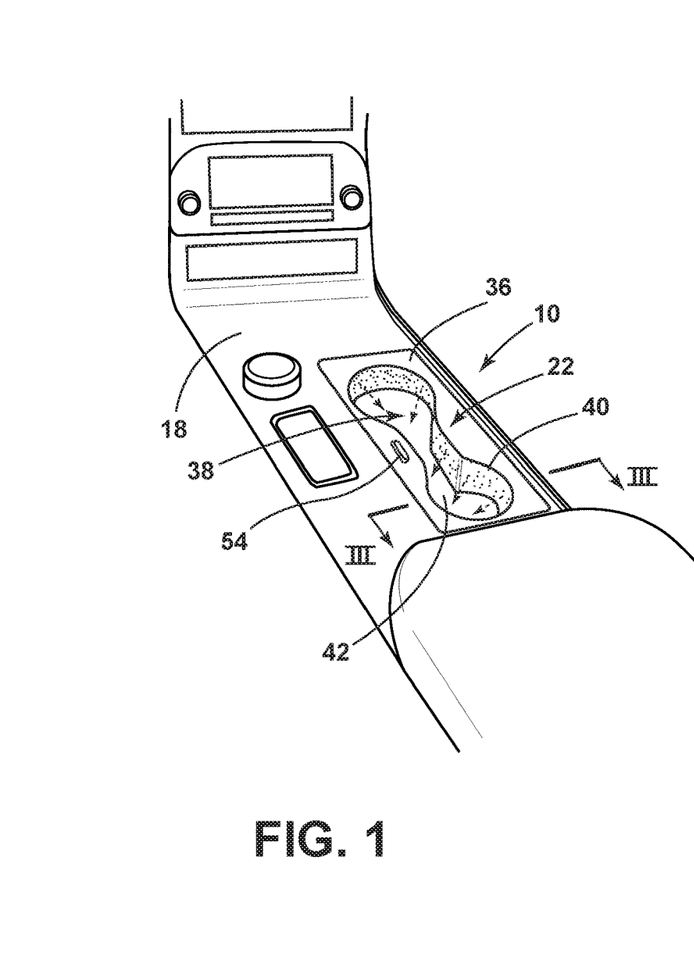
FIG. 1 is a perspective view of one embodiment of a vehicle cup holder assembly in which an accessory is configured as an insert and is shown in a stowed position.
Figure 2:
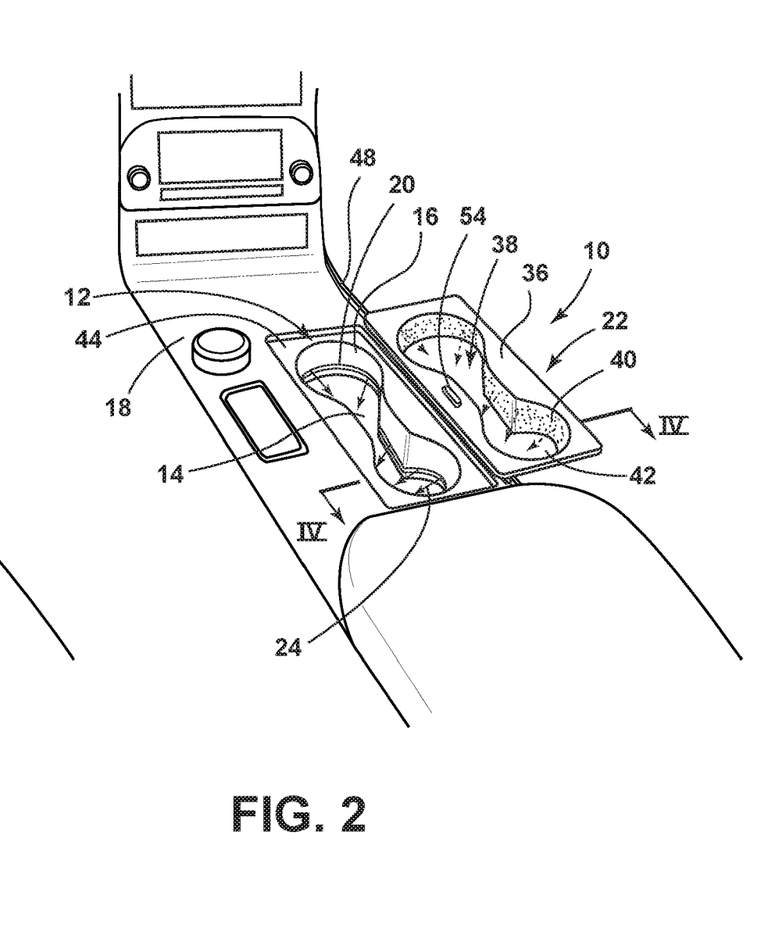
FIG. 2 illustrates the accessory in a deployed position.
Figures 3, 4:
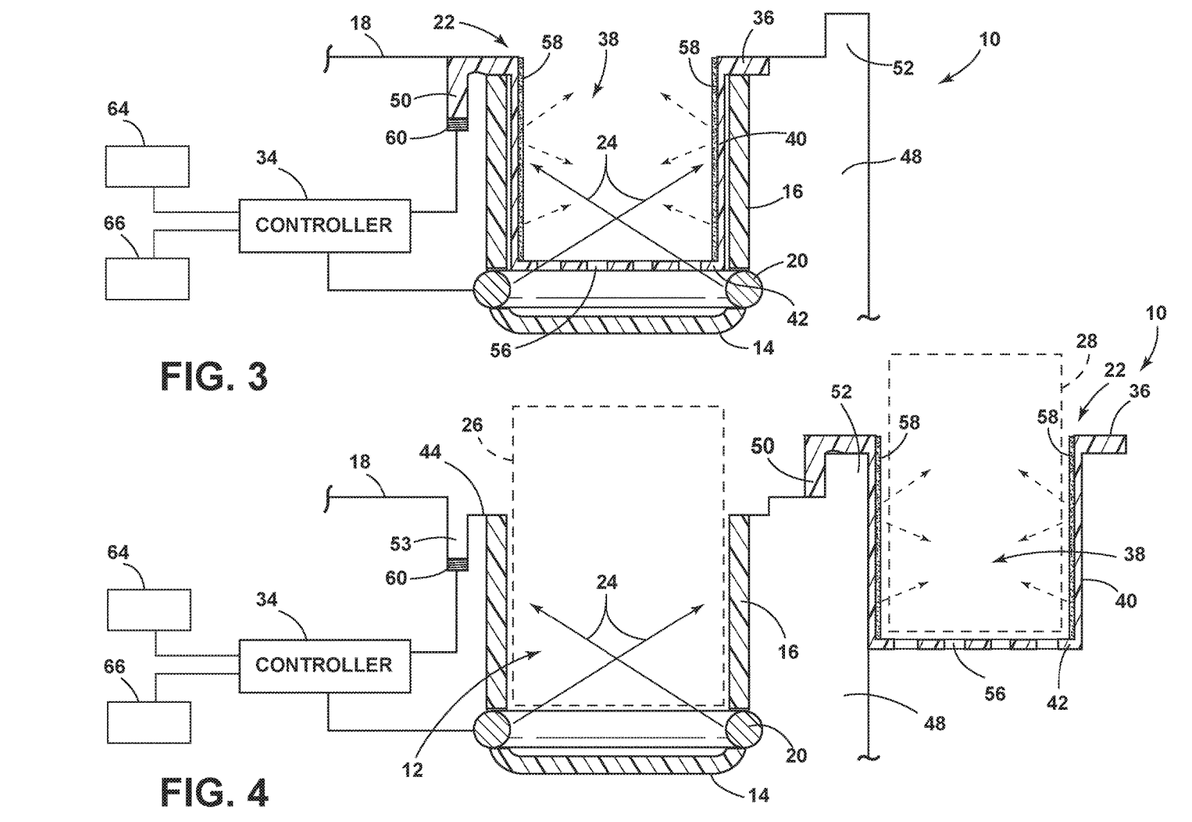
FIG. 3 is a cross-sectional view of the vehicle cup holder assembly taken along line of FIG. 1.
FIG. 4 is a cross-sectional view of the vehicle cup holder assembly taken along line IV-IV of FIG. 2.

With specific reference to FIGS. 1-4, a first embodiment of the vehicle cup holder assembly 10 is shown. As depicted, the receptacle 12 is defined by a base 14 and a sidewall 16. The light source 20 may be integrated with or otherwise assembled to the receptacle 12 and is configured to illuminate the same. The accessory 22 is configured as an insert that is stowable in the receptacle 12 and is configured to luminesce in response to light excitation 24 by the light source 20. The accessory 22 is deployable from the receptacle 12 to enable receipt of a beverage container in either the receptacle 12 or the accessory 22. For example, as shown in FIG. 4, a beverage container 26 is received in the receptacle 12 and an additional beverage container 28 is received in the accessory 22. Thus, when the accessory 22 is in a deployed position, the amount of cup holders in which to receive a beverage container is increased, thereby providing improved storage options to vehicle occupants. In the depicted embodiment, the number of cup holders is effectively doubled when the accessory 22 is deployed from receptacle 12.

In the depicted embodiment, the base 14 and sidewall 16 may be constructed from a resilient material such as plastic, for example, and may be unitary in construction or provided as separate pieces assembled together by any known means. The receptacle 12 is exemplarily configured to receive up to two beverage containers but may be otherwise configured to receive more or less beverage containers if desired. Receiving portions of receptacle 12 may be configured as a cylinder, truncated cone, or any other desired geometry. The light source 20 is provided in a lower extremity of receptacle 12. In alternative embodiments, the light source 20 may be provided higher along the receptacle 12. When embodied as multiple LEDs, the light source 20 may be configured to emit light in one or more colors. Light emitted by the light source 20 includes light excitation 24, which may be expressed as visible light (e.g., blue light) or invisible light (e.g., ultraviolet or infrared). The light source 20 is operated by a controller 34 variously located in the vehicle and having light driving circuitry for activating/deactivating the light source 20. The controller 34 may control activation/deactivation of the light source 20 in response to input provided by vehicle equipment or a vehicle occupant via a user-input mechanism. With respect to the present disclosure, is to be understood that a light source, as defined herein, may include an origination source of light (e.g., one or more LEDs or other direct lighting devices) and/or an optical device for transmitting light received from the origination source (e.g., light guides, light rings, etc.).

The accessory 22 is form fitted to the receptacle 12 and may be constructed from a resilient material such as plastic, for example. In the depicted embodiment, the accessory 22 includes a feed neck 36 and a receptacle 38 extending downwardly therefrom and defined by a luminescent sidewall 40 and a base 42. The receptacle 38 is generally contoured to the receptacle 12 but may be otherwise configured in other geometries so long as the receptacle 38 is able to be received in receptacle 12. The feed neck 36, sidewall 40, and base 42 may be unitary in construction or provided as separate pieces assembled together by any known means. In the depicted embodiment, the feed neck 36 defines an upper extremity of the accessory 22 and is substantially planar. In other embodiments, the feed neck 36 may take on other geometries if desired. For aesthetic purposes, the vehicle console 18 may include a recessed portion 44 dimensioned to receive and support the feed neck 36 when the accessory 22 is stowed in receptacle 12. It is contemplated that the feed neck 36 may have a complimentary height to the recessed portion 44 so as to be flush therewith when the accessory 22 is in a stowed position.

The accessory 22 is deployable from the stowed position and is configured to be removably engaged (e.g., hung) to a side 48 of the vehicle console 18 to enable a beverage container to be received in either the receptacle 12 or the accessory 22. Alternatively, the accessory 22 may be removably engaged to other structures in the general vicinity of the vehicle console 18 and accessible by one or more vehicle occupants. The feed neck 36 may include a tab 50 extending downwardly therefrom and configured to latch onto a raised edge 52 of the side 48 of the vehicle console 18. Side 48 may be generally located in either the passenger compartment or the driver compartment. The tab 50 may extend lengthwise relative the feed neck 36 and the recessed portion 44 may include a channel 53 dimensioned to receive the tab 50 when the accessory 22 is stowed in the receptacle 12. In this manner, the accessory 22 is flush with the vehicle console 18 when stowed in the receptacle 12. A handle 54 may be variously located on the feed neck 36 for assisting a user in deploying and stowing the accessory 22.

The base 42 of the accessory 22 is light-transmissive such that light excitation 24 emitted by the light source 20 is able to be transmitted to the sidewall 40 in order to excite the same. In the depicted embodiment, the base 42 includes one or more openings 56 for allowing light excitation 24 to enter receptacle 38 and be received by the sidewall 40. Additionally or alternatively, the base 42 may include a light-transmissive material. In the depicted embodiment, the sidewall 40 includes a photoluminescent material 58 coupled thereto or otherwise integrated therewith. While not shown, it is contemplated that other portions (e.g., base 42) of the receptacle 38 may be configured to luminesce in response to light excitation 24, if desired.

According to one embodiment, the photoluminescent material 58 includes a long-persistence photoluminescent material that becomes excited in response to light excitation 24. In response, the photoluminescent material 58 converts light excitation 24 to light of a different wavelength. With respect to the present embodiment, conversion may occur via up or down conversion and the converted light may be expressed in a variety of visible colors. In one specific embodiment, light excitation 24 includes ultraviolet, infrared, or blue light and the converted light may be expressed as visible light of any color, typically chosen from a conventional RGB color scale. With respect to the present disclosure, the long-persistence photoluminescent material is characterized as having a decay time, that is, the photoluminescent material 58 is able to continue to luminesce for a period of time after light excitation 24 ceases to be provided. For example, known long-persistence photoluminescent materials may luminesce for a period of several minutes or hours. Information regarding the production of long-persistence photoluminescent materials is disclosed in U.S. Pat. No. 8,163,201 to Agrawal et al., the entire disclosure of which is incorporated herein by reference. Additionally, information regarding photoluminescent structures is disclosed in U.S. Pat. No. 6,953,536 to Yen et al., U.S. Pat. No. 6,117,362 to Yen et al., and U.S. Pat. No. 8,952,341 to Kingsley et al., all of which are incorporated herein by reference in their entirety.

By employing long-persistence photoluminescent material, the sidewall 40 of the accessory 22 is capable of luminescing for extended periods of time after the accessory 22 is deployed and light excitation 24 ceases to be provided. As a result, nighttime operation of the accessory 22 is enhanced as the luminescence provided by the sidewall 40 aids a user in locating the receptacle 38 or a beverage container received therein in dark conditions. While the photoluminescent material 58 has been described to include a long-persistence photoluminescent material, it is to be understood that any photoluminescent material may be used in its place, including those that luminesce for shorter periods of time once light excitation is no longer available.

A sensor 60 is provided in the vehicle console 18 for detecting the accessory 22 in the stowed position. The sensor 60 may be any type of contact or proximity sensor and is exemplarily shown positioned inside the vehicle console 18 to detect the tab 50 of the accessory 22. In alternative embodiments, the sensor 60 may be elsewhere located to detect other parts of the accessory 22. The controller 34 is configured to operate the light source 20 based on input received from the sensor 60. For example, detection of the accessory 22 in the stowed position may prompt the controller 34 to activate the light source 20 in order to provide light excitation 24 to the sidewall 40, whereas failure to detect the accessory 22 in the stowed position may prompt the controller 34 to deactivate the light source 20 or otherwise control the light source 20 to emit ambient light to illuminate the receptacle 12. It is contemplated that the ambient light may be the same as light excitation 24 or a different colored light that is visible.

In some embodiments, the controller 34 may additionally receive input from a vehicle light sensor 64 and operate the light source 20 based on input received therefrom. For example, if the vehicle light sensor 64 detects a nighttime condition, the controller 34 may activate the light source 20 to emit ambient light if the sensor 60 fails to detect the accessory 22 or supply light excitation 24 to the accessory 22 if detected by the sensor 60. In some embodiments, a vehicle occupant may specify the color of light emitted by the light source 20. In instances where the specified color is not that of the light excitation 24, it is contemplated that the controller 34 may periodically activate the light source 20 to provide light excitation 24 to the accessory 22 when the vehicle is unoccupied and the accessory 22 is detected in the stowed position. The controller 34 may determine vehicle occupancy from input provided by sensor 66, which may include a door sensor, seat sensor, or any other sensor indicating the presence, or lack thereof, of a vehicle occupant. Additionally, the controller 34 may rely on input from the vehicle light sensor 64 so as to periodically activate the light source 20 at night to provide light excitation 24 to the accessory 22 if the accessory 22 is detected in the stowed position.

Figure 5:
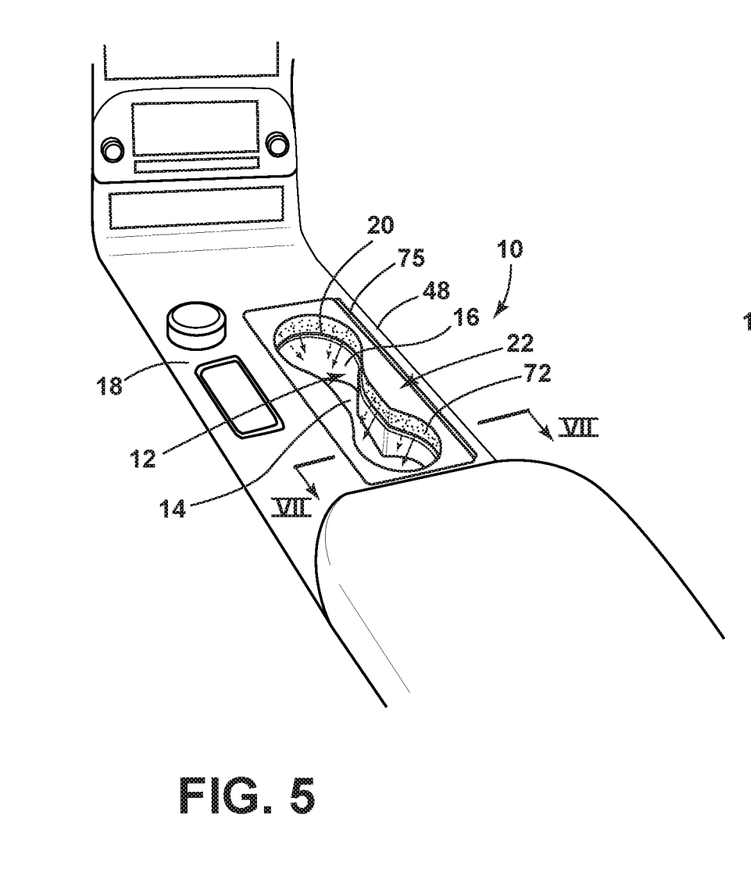
FIG. 5 is a perspective of another embodiment of the vehicle cup holder assembly in which the accessory is configured as a lid and is shown in a cover position.
Figure 6:
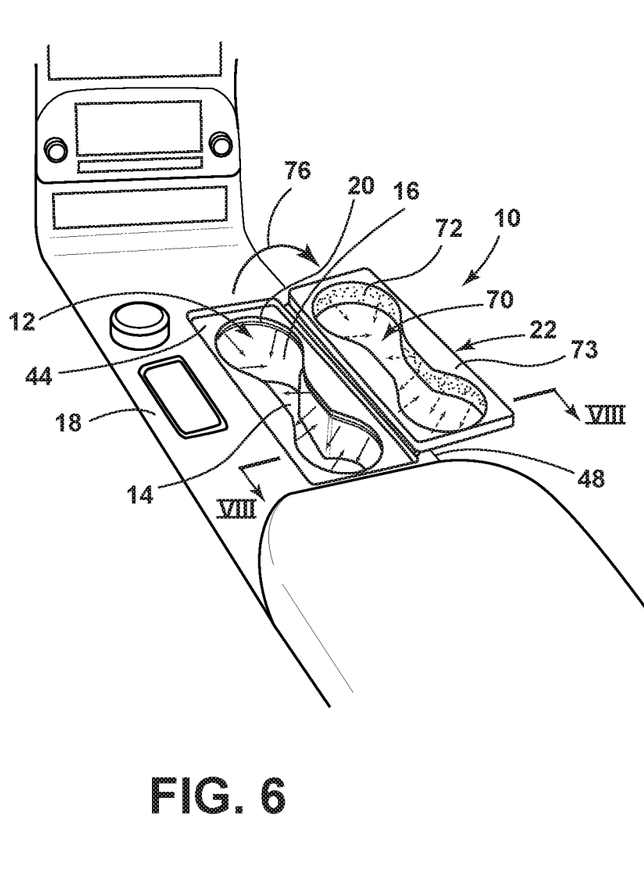
FIG. 6 illustrates the accessory in a deployed position.
Figures 7, 8:
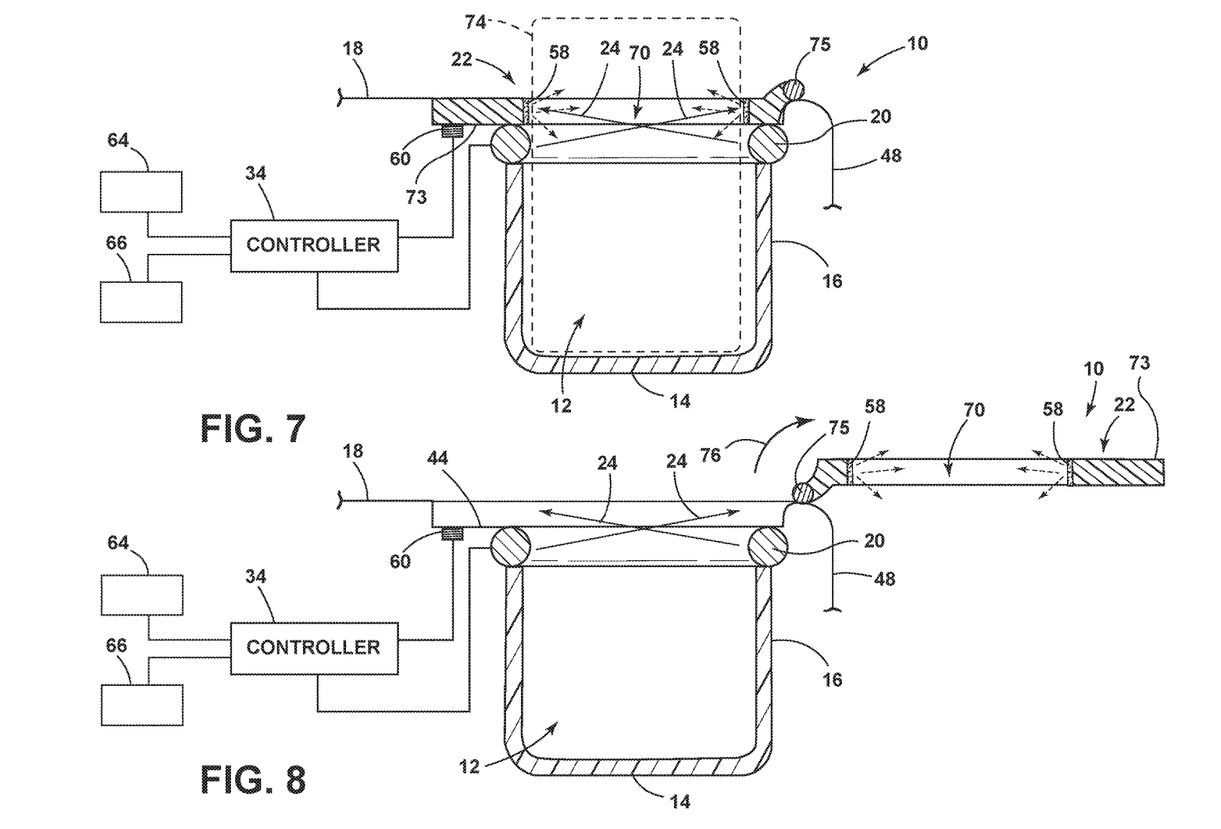
FIG. 7 is a cross-sectional view of the vehicle cup holder assembly taken along line VII-VII of FIG. 5.
FIG. 8 is a cross-sectional view of the vehicle cup holder assembly taken along line VIII-VIII of FIG. 6.

Referring to FIGS. 5-8, a second embodiment of the vehicle cup holder assembly 10 is shown. In the depicted embodiment, the light source 20 is located at an upper extremity of the receptacle 12. The accessory 22 is configured as a lid removably covering the receptacle 12 as shown in FIGS. 5 and 7. The accessory 22 is planar and may be dimensioned to fit in the recessed portion 44 of the vehicle console 18 so as to be flush therewith. The accessory 22 includes a cutout 70 that interfaces with the receptacle 12 to enable a beverage container 74 to be received therein (FIG. 7). Additionally, the accessory 22 is deployable from the receptacle as shown in FIGS. 6 and 8. In the depicted embodiment, the accessory 22 is pivotally coupled to the vehicle console 18 via a hinge 75 to enable the accessory 22 to be flipped to a deployed position in the direction generally specified by arrow 76. In the deployed position, the accessory 22 is cantilevered off the side 48 of the vehicle console 18 such that a beverage container is receivable in either the receptacle 12 or the cutout 70. Thus, when the accessory 22 is moved to the deployed position, the vehicle cup holder assembly 10 is able to receive a greater number of beverage containers than would otherwise be possible if the accessory 22 were in a cover position.

When the accessory 22 is in the cover position, a luminescent portion 72 in proximity of the light source 20 is configured to luminesce in response to light excitation 24 by the light source 20. In the depicted embodiment, the luminescent portion 72 defines the cutout 70 but may additionally or otherwise correspond to other portions (e.g., underside 73) of the accessory 22. The photoluminescent portion 72 may include the photoluminescent material 58 described previously herein and configured as a long-persistence photoluminescent material that becomes excited by light excitation 24, which may include invisible or visible light. By utilizing a long-persistence photoluminescent material, the luminescent portion 72 is capable of luminescing for extended periods of time after the accessory 22 is moved to the open position and light excitation 24 ceases to be provided. As a result, nighttime operation of the accessory 22 is enhanced as the luminescence provided by the luminescent portion 72 aids a user in locating the cutout 70 or a beverage container received therein in dark conditions.

Similar to the embodiment shown in FIGS. 1-4, the light source 20 may be operated by controller 34 based on input provided from sensor 60, which is configured to detect the accessory 22 in the cover position. That is, detection of the accessory 22 in the cover position may prompt the controller 34 to activate the light source 20 in order to provide the light excitation 24 to the luminescent portion 72, whereas failure to detect the accessory 22 in the cover position may prompt the controller 34 to deactivate the light source 20 or otherwise control the light source 20 to emit ambient light. It is contemplated that the ambient light may be the same as light excitation 24 or a different colored light that is visible. Additionally, the controller 34 may operate the light source 20 based on input received from the vehicle light sensor 64, sensor 66, or a combination thereof, as described previously herein.

Accordingly, a vehicle cup holder assembly has been advantageously described herein. According to various embodiments, the vehicle cup holder assembly includes a receptacle assembled to a vehicle console. A light source is coupled to the receptacle. An accessory is coupled to the receptacle and is deployable therefrom to increase the number of available cup holders in which to receive a beverage container. The accessory is configured to luminesce in response to light excitation by the light source. Embodiments of the vehicle cup holder assembly may include any one or a combination of the following features:

- the accessory is configured as an insert that is stowable in the receptacle and deployable therefrom;
- the accessory is configured to be removably engaged to a side of the vehicle console in a deployed position to enable the beverage container to be received in either the receptacle or the accessory;
- the light source is located at a lower extremity of the receptacle and light excitation is transmitted through a base of the accessory to excite a luminescent sidewall of the accessory;
- a sensor configured to detect the accessory in a stowed position and a controller configured to operate the light source based on input received from the sensor;
- detection of the accessory in the stowed position prompts the controller to activate the light source in order to provide light excitation to the accessory;
- the accessory is configured as a lid removably covering the receptacle and having a cutout interfacing with the receptacle to enable the beverage container to be received in the receptacle via the cutout;
- the light source is located at an upper extremity of the receptacle and comprises a luminescent portion in proximity to the light source when the accessory is in a cover position;
- a sensor configured to detect the accessory in a cover position and a controller configured to operate the light source based on input received from the sensor;
- detection of the accessory in the cover position prompts the controller to activate the light source in order to provide light excitation to the accessory;
- the accessory is pivotally coupled to the vehicle console via a hinge;
- in a deployed position, the accessory is cantilevered off a side of the vehicle console to enable a beverage container to be received in either the receptacle or the cutout; and/or
- the light excitation comprises one of visible and invisible light.

Modifications of the disclosure will occur to those skilled in the art and to those who make or use the disclosure. Therefore, it is understood that the embodiments shown in the drawings and described above are merely for illustrative purposes and not intended to limit the scope of the disclosure, which is defined by the following claims as interpreted according to the principles of patent law, including the doctrine of equivalents.

It will be understood by one having ordinary skill in the art that construction of the described disclosure, and other components, is not limited to any specific material. Other exemplary embodiments of the disclosure disclosed herein may be formed from a wide variety of materials, unless described otherwise herein.

For purposes of this disclosure, the term "coupled" (in all of its forms: couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature, or may be removable or releasable in nature, unless otherwise stated.

It is also important to note that the construction and arrangement of the elements of the disclosure, as shown in the exemplary embodiments, is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts, or elements shown as multiple parts may be integrally formed, the operation of the interfaces may be reversed or otherwise varied, the length or width of the structures and/or members or connector or other elements of the system may be varied, and the nature or numeral of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes, or steps within described processes, may be combined with other disclosed processes or steps to form structures within the scope of the present disclosure. The exemplary structures and processes disclosed herein are for illustrative purposes and are not to be construed as limiting.

It is also to be understood that variations and modifications can be made on the aforementioned structures and methods without departing from the concepts of the present disclosure, and further, it is to be understood that such concepts are intended to be covered by the following claims, unless these claims, by their language, expressly state otherwise. Further, the claims, as set forth below, are incorporated into and constitute part of this Detailed Description.

What is claimed is:

1. A vehicle cup holder assembly comprising:
a receptacle assembled to a vehicle console;
a light source coupled to the receptacle; and
an accessory stowable in the receptacle and deployable therefrom to enable receipt of a beverage container in either the receptacle or the accessory, wherein the accessory is configured to be removably engaged to a side of the vehicle console in a deployed position and luminesce in response to light excitation by the light source.

2. The vehicle cup holder assembly of claim 1, wherein the light source is located at a lower extremity of the receptacle and light excitation is transmitted through a base of the accessory to excite a luminescent sidewall of the accessory.

3. The vehicle cup holder assembly of claim 1, further comprising a sensor configured to detect the accessory in a stowed position and a controller configured to operate the light source based on input received from the sensor.

4. The vehicle cup holder assembly of claim 3, wherein detection of the accessory in the stowed position prompts the controller to activate the light source in order to provide light excitation to the accessory.

5. The vehicle cup holder assembly of claim 1, wherein the light excitation comprises one of visible and invisible light.

6. A vehicle cup holder assembly comprising:
a receptacle assembled to a vehicle console;
a light source coupled to the receptacle; and
an accessory covering the receptacle and comprising a cutout interfacing with the receptacle, wherein the accessory is configured to luminesce in response to light excitation by the light source, and wherein the accessory is deployable to enable receipt of a beverage container in either the receptacle or the cutout, and wherein the light source is located at an upper extremity of the receptacle and comprises a luminescent portion in proximity to the light source when the accessory is in a cover position.

7. The vehicle cup holder assembly of claim 6, further comprising a sensor configured to detect the accessory in the cover position and a controller configured to operate the light source based on input received from the sensor.

8. The vehicle cup holder assembly of claim 7, wherein detection of the accessory in the cover position prompts the controller to activate the light source in order to provide light excitation to the accessory.

9. The vehicle cup holder assembly of claim 6, wherein the accessory is pivotally coupled to the vehicle console via a hinge.

10. The vehicle cup holder assembly of claim 9, wherein in a deployed position, the accessory is cantilevered off a side of the vehicle console.

11. The vehicle cup holder assembly of claim 6, wherein the light excitation comprises one of visible and invisible light.

12. A vehicle cup holder assembly comprising:
a receptacle assembled to a vehicle console;
an accessory coupled to the receptacle and configured to move from a first position to a deployed position to increase the number of available cup holders; and
a light source coupled to the receptacle and operable to provide light excitation to the accessory based on detection of the accessory in the first position, wherein the light excitation causes the accessory to luminesce.

13. The vehicle cup holder assembly of claim 12, wherein the accessory is configured as an insert that is stowable in the receptacle and deployable therefrom.

14. The vehicle cup holder assembly of claim 13, wherein the accessory is configured to be removably engaged to a side of the vehicle console in the deployed position to enable a beverage container to be received in either the receptacle or the accessory.

15. The vehicle cup holder assembly of claim 13, wherein the first position is a stowed position.

16. The vehicle cup holder assembly of claim 12, wherein the accessory is configured as a lid removably covering the receptacle and having a cutout interfacing with the receptacle to enable the beverage container to be received in the receptacle via the cutout.

17. The vehicle cup holder assembly of claim 16, wherein the accessory is pivotally coupled to the vehicle console via a hinge, and the accessory is cantilevered off a side of the vehicle console, while in the deployed position to enable a beverage container to be received in either the receptacle or the cutout.

18. The vehicle cup holder assembly of claim 16, wherein the first position is a cover position.

* * * * *